US008678950B2

(12) United States Patent
Boyd

(10) Patent No.: US 8,678,950 B2
(45) Date of Patent: *Mar. 25, 2014

(54) MULTI-COMPONENT GOLF CLUB HEAD

(71) Applicant: Nike, Inc., Beaverton, OR (US)

(72) Inventor: Robert Boyd, Euless, TX (US)

(73) Assignee: Nike, Inc., Beaverton, OR (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/730,251

(22) Filed: Dec. 28, 2012

(65) Prior Publication Data
US 2013/0178308 A1 Jul. 11, 2013

Related U.S. Application Data

(63) Continuation of application No. 12/467,858, filed on May 18, 2009, now Pat. No. 8,342,984.

(51) Int. Cl.
A63B 53/04 (2006.01)

(52) U.S. Cl.
USPC .......................................... 473/345

(58) Field of Classification Search
USPC .......................................... 473/345
See application file for complete search history.

(56) References Cited

U.S. PATENT DOCUMENTS

| 5,255,913 | A | 10/1993 | Tsuchida |
| 5,316,298 | A | 5/1994 | Hutin et al. |
| 5,624,331 | A * | 4/1997 | Lo et al. ................ 473/345 |
| 5,720,674 | A * | 2/1998 | Galy ..................... 473/345 |
| 5,807,190 | A | 9/1998 | Krumme et al. |
| 6,302,807 | B1 | 10/2001 | Rohrer |
| 6,348,013 | B1 | 2/2002 | Kosmatka |
| 6,478,693 | B2 | 11/2002 | Matsunaga et al. |
| 6,488,594 | B1 | 12/2002 | Card et al. |
| 6,582,323 | B2 | 6/2003 | Soracco et al. |
| 6,783,466 | B2 | 8/2004 | Seki et al. |
| 6,849,003 | B2 | 2/2005 | Kumamoto |
| 6,902,496 | B2 | 6/2005 | Solheim et al. |
| 6,929,565 | B2 | 8/2005 | Nakahara et al. |
| 6,949,031 | B2 | 9/2005 | Imamoto et al. |
| 7,108,614 | B2 | 9/2006 | Lo |
| 7,147,575 | B2 | 12/2006 | Galloway et al. |
| 7,147,576 | B2 | 12/2006 | Imamoto et al. |
| 7,169,059 | B2 | 1/2007 | Rice et al. |
| 7,182,699 | B2 | 2/2007 | Matsunaga et al. |
| 7,338,390 | B2 | 3/2008 | Lindsay |
| 2003/0036442 | A1 | 2/2003 | Chao et al. |
| 2003/0083151 | A1 | 5/2003 | Nakahara et al. |
| 2005/0059508 | A1 | 3/2005 | Burnett et al. |

(Continued)

FOREIGN PATENT DOCUMENTS

| JP | 03007178 | 1/1991 |
| JP | 04089071 | 3/1992 |

Primary Examiner — Michael Dennis
(74) Attorney, Agent, or Firm — Banner & Witcoff, Ltd.

(57) ABSTRACT

A golf club head having multiple components is provided. The golf club head includes a plurality of components wherein at least one component exhibits a different modulus of elasticity than the other components. In some structures, one or more of the plurality of components that comprise the golf club head is titanium or titanium alloy component provided in the heel and/or toe areas of the club head structure immediately adjacent the ball striking face, wherein that titanium or titanium alloy component has a lower modulus of elasticity than the material making up the club face and/or other club head body components.

9 Claims, 8 Drawing Sheets

(56) References Cited

U.S. PATENT DOCUMENTS

| | | |
|---|---|---|
| 2005/0137028 A1 | 6/2005 | Lukasiewicz et al. |
| 2006/0089207 A1* | 4/2006 | Galloway et al. ............. 473/345 |
| 2007/0049407 A1 | 3/2007 | Tateno et al. |
| 2007/0049411 A1 | 3/2007 | Matsunaga |
| 2007/0082751 A1 | 4/2007 | Lo et al. |
| 2007/0149311 A1 | 6/2007 | Wright et al. |
| 2007/0155532 A1 | 7/2007 | Adams |
| 2007/0232407 A1 | 10/2007 | Tavares |
| 2009/0163293 A1 | 6/2009 | Gibbs et al. |
| 2010/0056298 A1* | 3/2010 | Jertson et al. ................. 473/345 |

* cited by examiner

MULTI-COMPONENT GOLF CLUB HEAD

CROSS-REFERENCE TO RELATED APPLICATIONS

This application claims the benefit of, and is a Continuation of, co-pending prior U.S. application Ser. No. 12/467,858, filed May 18, 2009, which is incorporated by reference in its entirety for any and all non-limiting purposes.

FIELD OF THE INVENTION

This invention relates generally to golf clubs and golf club heads. More particularly, aspects of this invention relate to golf club heads (and methods relating to the same) comprising a component having a lower modulus of elasticity than other components. The low modulus of elasticity components are more susceptible to deformation, thereby increasing the club head coefficient of restitution in certain locations.

BACKGROUND

Golf is enjoyed by a wide variety of players—players of different genders and dramatically different ages and/or skill levels. Golf is somewhat unique in the sporting world in that such diverse collections of players can play together in golf events, even in direct competition with one another (e.g., using handicapped scoring, different tee boxes, in team formats, etc.), and still enjoy the golf outing or competition. These factors, together with the increased availability of golf programming on television (e.g., golf tournaments, golf news, golf history, and/or other golf programming) and the rise of well-known golf superstars, at least in part, have increased golf's popularity in recent years, both in the United States and across the world.

Golfers at all skill levels seek to improve their performance, lower their golf scores, and reach that next performance "level." Manufacturers of all types of golf equipment have responded to these demands, and in recent years, the industry has witnessed dramatic changes and improvements in golf equipment. For example, a wide range of different golf ball models now are available, with balls designed to complement specific swing speeds and/or other player characteristics or preferences, e.g., with some balls designed to fly farther and/or straighter; some designed to provide higher or flatter trajectories; some designed to provide more spin, control, and/or feel (particularly around the greens); some designed for faster or slower swing speeds; etc. A host of swing and/or teaching aids also are available on the market that promise to help lower one's golf scores.

Being the sole instrument that sets a golf ball in motion during play, golf clubs also have been the subject of much technological research and advancement in recent years. For example, the market has seen dramatic changes and improvements in putter designs, golf club head designs, shafts, and grips in recent years. Additionally, other technological advancements have been made in an effort to better match the various elements and/or characteristics of the golf club and characteristics of a golf ball to a particular user's swing features or characteristics (e.g., club fitting technology, ball launch angle measurement technology, ball spin rates, etc.).

Given the recent advances, there is a vast array of golf club component parts available to the golfer. For example, club heads are produced by a wide variety of manufacturers in a variety of different models. Moreover, the individual club head models may include multiple variations, such as variations in the loft angle, lie angle, offset features, weighting characteristics (e.g., draw biased club heads, fade biased club heads, neutrally weighted club heads, etc.), etc. Multiple different shafts having differing characteristics, such as flex, kickpoint location, etc., also are available. These features give golfers many golf club characteristics and combinations of characteristics from which to choose when selecting a golf club structure that best suits their swing and/or playing style.

In furtherance of improving performance, club designers also have investigated increasing the coefficient of restitution ("COR") of club heads. The term "COR" also is referred to in the industry as providing a measure of the "trampoline effect" exhibited by a golf club face when it contacts the golf ball. Generally, a COR value provides a measurement of the energy transferred from a first object to a second object upon impact. In golf, COR values may be used to measure the amount of energy transferred from the club to a ball upon impact. COR values are generally expressed numerically from 0 to 1, where 0 would indicate that all energy was lost in the impact, and thus no energy was transferred from the golf club to the ball. In contrast, a COR value of 1 would indicate that 100% of the energy was transferred from the club to the ball on impact. Although other factors may play a role in the overall distance a golf ball travels as a result of a stroke, in general, the higher the COR value for the club face, the larger the amount of energy transferred to the ball (as described above), and thus the higher launch velocity of the ball, which may result in greater distance. The Rules of Golf currently limited a golf club to having a maximum COR value of 0.83.

The "COR" of a golf club face depends on various factors, including, for example, the location on the face where contact with the ball is made. Generally, the COR of a golf club face is highest at a central portion of the club head face, because this portion of the face tends to be the most deformable and thus exhibits the greatest "trampoline effect." The COR of a club head generally decreases as one moves away from the central area of the face, e.g., due to additional stiffness provided because of bends in the face structure, the sidewalls, and/or other structures located at the sides of the club face.

While advances have been made to increase the coefficient of restitution of golf club heads, additional improvements in this technological area would be a welcome advance in the art.

SUMMARY

The following presents a general summary of aspects of the invention in order to provide a basic understanding of the invention and various features of it. This summary is not intended to limit the scope of the invention in any way, but it simply provides a general overview and context for the more detailed description that follows.

Aspects of the invention relate to golf club heads (e.g., hollow, wood-type golf club heads, such as drivers) that include a plurality of components wherein at least one component exhibits a different modulus of elasticity than the other components. In one embodiment, one or more of the plurality of components that comprise the golf club head is a titanium or a titanium alloy component. In another embodiment, at least the heel and toe areas of the club head structure that are in proximity to the club face (e.g., immediately adjacent the face component) comprise a titanium component that has a lower modulus of elasticity than at least some of the other materials comprising the remainder of the head and/or the other materials immediately adjacent the face. In one such embodiment, at least the toe and/or heel areas proximate to the face comprise a Titanium 15-3-3-3 alloy, while at least some of the other materials of the club head comprise metal or metal alloys having a higher modulus of elasticity than Titanium 15-3-3-3. Using materials exhibiting a lower modulus of elasticity make these areas more susceptible to deformation, thereby increasing the club head coefficient of restitution at least in the heel and toe areas of the club head as compared with similar club head structures that do not include this lower modulus material (e.g., the overall surface area of the face that exhibits a high COR response will be increased by increasing the COR response of the club head in the heel and toe directions of the club head face).

In still yet further embodiments, a first body portion having a relatively low modulus of elasticity may be positioned to create a circumference proximate to the club face and extending less than a predefined distance toward the rearmost trailing edge or point of the head at each of the toe area and the heel area (e.g., less than 60% of this distance, and in some examples, less than 40% of this distance, less than 25% of this distance, or even less than 15% of this distance). This same first body portion, however, may include a central portion that extends a different and greater predefined distance toward the trailing edge or point at the center crown portion of the club face and/or at the center sole portion of the club face (e.g., at least 40% of this distance, and in some examples, at least 50% of this distance, at least 65% of this distance, at least 75% of this distance, or even at least 90% of this distance).

Still additional aspects of this invention relate to golf club heads having: (a) a club face extending from a toe area to a heel area; (b) a first body portion engaged at the heel area of the club face, wherein the first body portion extends in a front-to-rear direction at least 10% of an overall club head breadth dimension and less than 60% of the overall club head breadth dimension, and wherein the first body portion has a first modulus of elasticity; (c) a second body portion engaged at the toe area of the club face, wherein the second body portion extends in the front-to-rear direction at least 10% of the overall club head breadth dimension and less than 60% of the overall club head breadth dimension, wherein the second body portion has a second modulus of elasticity that may be the same as or different from the first modulus of elasticity; and (d) a third body portion having a higher modulus of elasticity than the first and second body portions, wherein the third body portion is engaged with the club face at about a center of the club face in a heel-to-toe direction and extends away from the club face toward the rear of the club head. In such structures, the third body portion and the club face may surround the first body portion and the second body portion.

Yet additional aspects of this invention relate to golf club heads having: (a) a club face extending from a toe area to a heel area; (b) a first body portion engaged with a perimeter portion of the club face, wherein the first body portion has a first modulus of elasticity and includes: (b1) a toe oriented portion that extends in a front-to-rear direction at least 10% of an overall club head breadth dimension and less than 60% of the overall club head breadth dimension, (b2) a heel oriented portion that extends in the front-to-rear direction at least 10% of the overall club head breadth dimension and less than 60% of the overall club head breadth dimension, and (b3) a center crown portion that extends in the front-to-rear direction at least 40% of the overall club head breadth dimension; and (c) a second body portion engaged with the first body portion and extending rearward from at least a portion of the first body portion, the second body portion having a higher modulus of elasticity than the first body portion. The first body portion of such club head structures further may include a center sole portion that extends in the front-to-rear direction at least 40% of the overall club head breadth dimension. If desired, the second body portion may be engaged with and extend rearward from the toe oriented portion of the first body portion, and the golf club head structure may further include a third body portion engaged with and extending rearward from the heel oriented portion of the first body portion, the second body portion having a higher modulus of elasticity than the first body portion, wherein the modulus of elasticity of the second body portion is the same as or different from the modulus of elasticity of the third body portion. In such structures, the center crown portion and the center sole portion of the first body portion may separate the second and third body portions from one another.

Another aspect of the invention relates to methods of producing golf club heads in accordance with examples of this invention. Such methods may include, for example, methods of combining a plurality of structural components of the golf club head to form the club head (e.g., by connecting various club head parts together using cements, adhesives, welding, soldering, brazing, mechanical connectors, etc.), wherein certain areas of the club head (e.g., at least the heel area and the toe area) will be more susceptible to deformation due to the presence of the relatively low modulus of elasticity material, thereby increasing the overall size of the club head ball striking surface that exhibits high coefficient of restitution characteristics (as compared to similar club head structures that do not include the lower modulus of elasticity portions).

BRIEF DESCRIPTION OF THE DRAWINGS

A more complete understanding of the present invention and certain advantages thereof may be acquired by referring to the following detailed description in consideration with the accompanying drawings, in which:

FIG. 2E is a side view of club head showing the toe area in the foreground and FIG. 2F is a side view of the same club head showing the heel area in the foreground;

FIG. 3E is a side view of club head showing the toe area in the foreground and FIG. 3F is a side view of the same club head showing the heel area in the foreground.

The reader is advised that the attached drawings are not necessarily drawn to scale.

DETAILED DESCRIPTION

In the following description of various example structures in accordance with the invention, reference is made to the accompanying drawings, which form a part hereof, and in which are shown by way of illustration various example golf club heads and golf club structures in accordance with the invention. Additionally, it is to be understood that other specific arrangements of parts and structures may be utilized, and structural and functional modifications may be made without departing from the scope of the present invention. Also, while the terms "top," "bottom," "front," "back," "rear," "side," "underside," "overhead," and the like may be used in this specification to describe various example features and elements of the invention, these terms are used herein as a matter of convenience, e.g., based on the example orientations shown in the figures and/or the orientations in typical use. Nothing in this specification should be construed as requiring a specific three dimensional or spatial orientation of structures in order to fall within the scope of this invention.

In general, as described above, aspects of this invention relate to golf club heads and golf clubs made from multiple parts or components. Specific examples of the invention are described in more detail below. The reader should understand that these specific examples are set forth merely to illustrate examples of the invention, and they should not be construed as limiting the invention.

A. Examples of Specific Embodiments

1. Exemplary Club Structure

Figure 1:
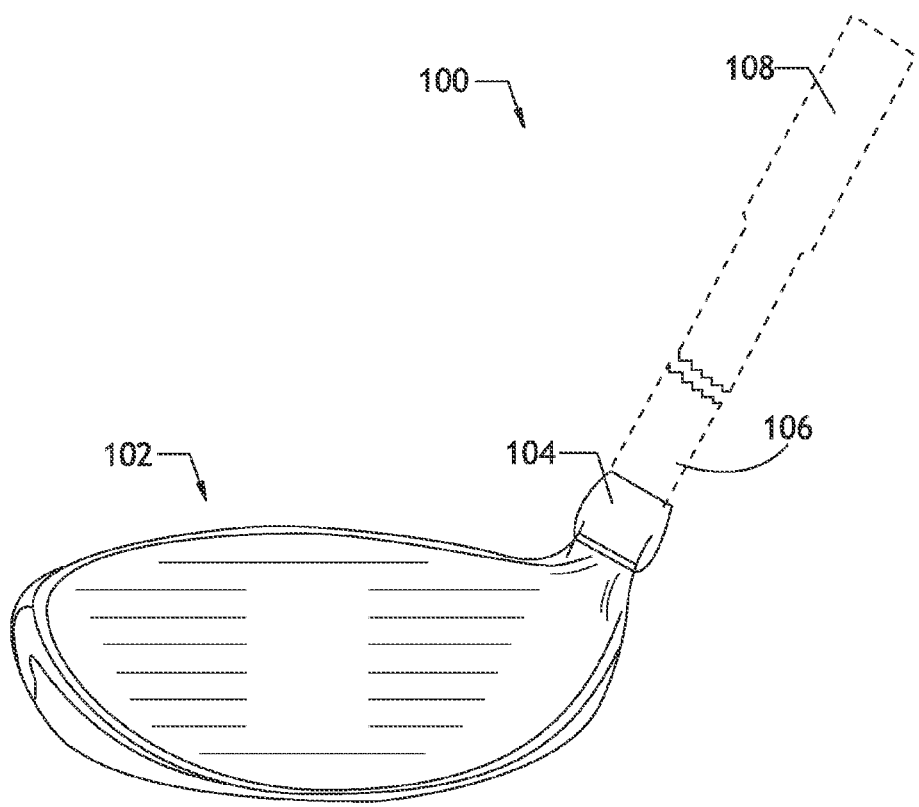
FIG. 1 generally illustrates a frontal view of an exemplary golf club according to embodiments of the invention.

FIG. 1 generally illustrates an exemplary golf club 100 in accordance with at least some embodiments of the invention. Exemplary club 100 includes a club head 102, a connection region 104 that connects the club head 102 to a shaft member 106 (which may be releasable in certain embodiments), and a grip member 108 engaged with the shaft member 106. While a hollow, driver/wood-type golf club head 102 is illustrated in FIG. 1, aspects of this invention may be applied to any wood-type club head, including, for example: fairway wood club heads; wood type hybrid golf club heads; and the like. Any desired connection between the head 102 and shaft 106 may be used without departing from this invention, including cements, adhesives, welds, solders, brazes, mechanical connectors (optionally releasable mechanical connectors), etc., including connection systems and mechanisms that are conventionally known and used in the art.

Any desired materials may be used for the shaft member 106, including suitable materials that are known and used in the art, such as steel, graphite, polymers, composite materials, combinations of these materials, etc. The grip member 108 may be engaged with the shaft member 106 in any desired manner, including in any suitable manners that are known and used in the art (e.g., via cements or adhesives, via mechanical connections, etc.). Any desired materials may be used for the grip member 108, including suitable materials that are known and used in the art, such as rubber, polymeric materials, cork, rubber or polymeric materials with cord or other fabric elements embedded therein, cloth or fabric, tape, etc. Optionally, if desired, the grip member 108 (or any suitable handle member) may be releasably connected to the shaft member 106 using a releasable connection. The club head 102 in accordance with some examples of this invention now will be described in more detail in conjunction with FIGS. 2A through 3F.

2. Exemplary Club Head

Figure 2A:
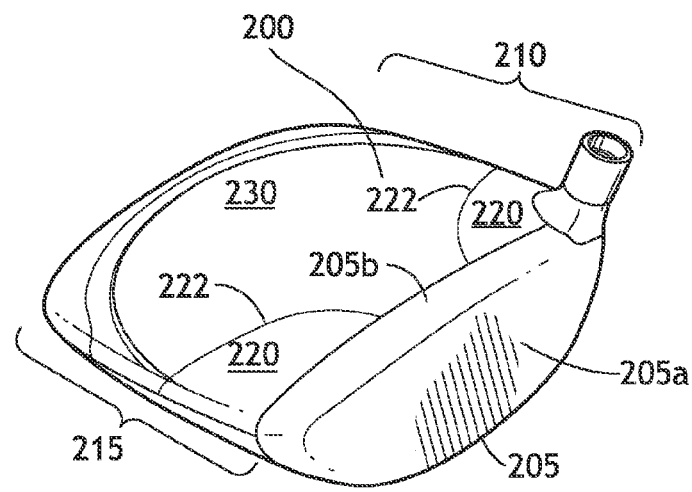
FIG. 2A shows a frontal perspective view of an example golf head according to an embodiment of the invention.

FIG. 2A shows a perspective view of an example hollow, wood-type club head 200 according to an embodiment of the invention. Exemplary club head 200 comprises a club face 205 configured to be the striking surface during contact with a golf ball. As seen in FIG. 2A, the club face 205 is disposed on the front end (facing toward the viewer and angled to the right of FIG. 2A) and generally extends from the heel area 210 to the toe area 215 of the club 200. While the club face 205 is shown as uniform in this figure, those skilled in the art will readily appreciate that the club face 205 may be shaped or sloped along one or more axes (e.g., exhibiting bulge and/or roll characteristics) and may further comprise other features, such as grooves or scorelines, over at least a portion of the surface, e.g., for increasing ball spin upon impact. The club head face 205 may be in the form of a "cup-shaped" face member, including a ball striking surface 205a and a "return portion" 205b extending rearward from the perimeter of the ball striking face surface 205a. The return portion 205b may extend rearward any desired distance, e.g., from 0.1 to 2.5 inches, and in some example structures, from 0.25 to 1.5 inches.

Figure 2B:
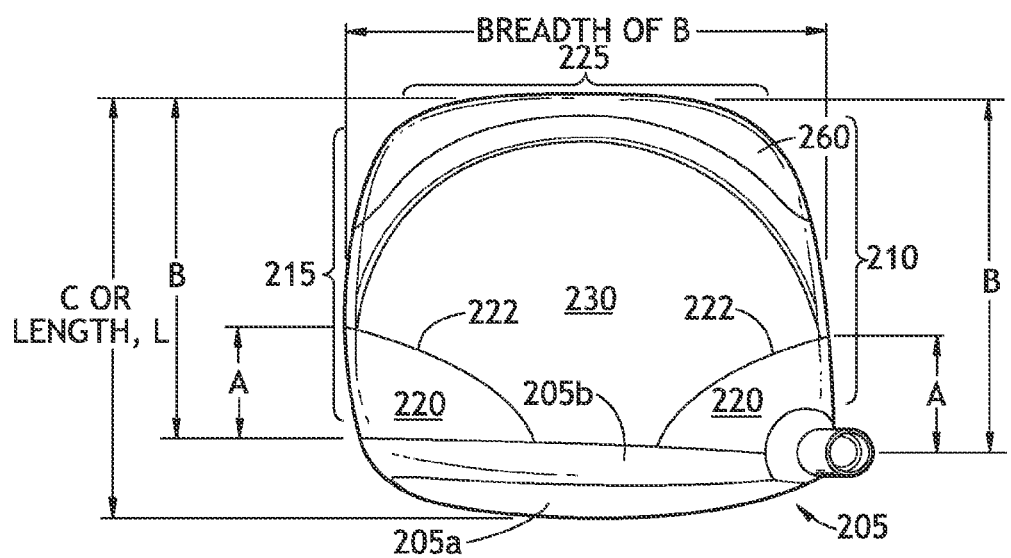
FIG. 2B is a top view of the example club head shown in FIG. 2A.
Figure 2C:
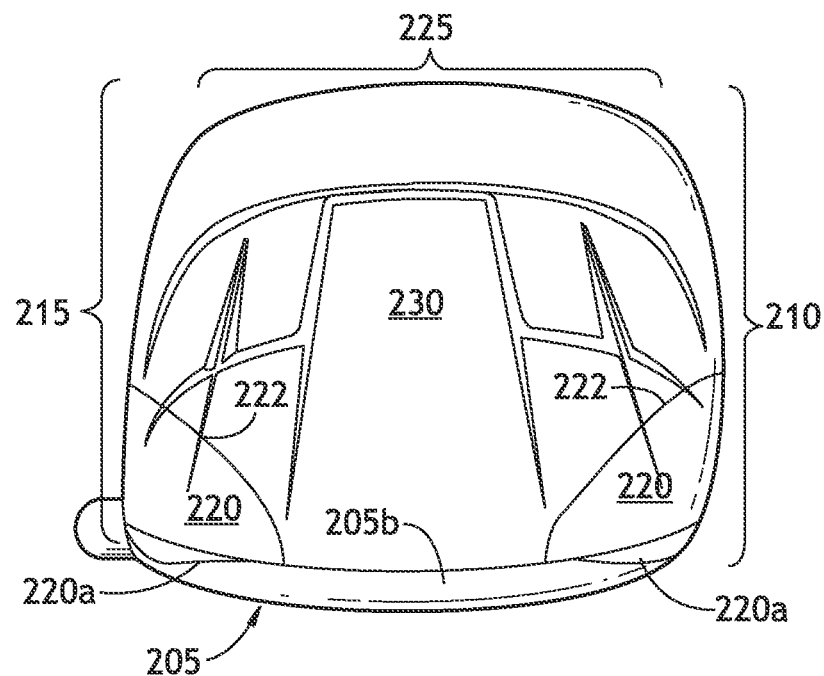
FIG. 2C is a bottom view of the example club head shown in FIG. 2A.

FIGS. 2B and 2C show top and bottom views, respectively, of the example club head 200 of FIG. 2A. Club head 200 comprises a first body portion 220 located proximate to the club face 205 at each of the heel area 210 and the toe area 215 of club 200. The first body portion 220 may constitute one or more independent parts or areas, or if desired, it may constitute a single continuous region (e.g., as shown in FIGS. 3A-3F and described in more detail below). Additionally, the first body portions 220 may extend rearward from the face 205 (dimension "A" in FIG. 2B) a distance of at least about 10% of the distance from the club face 205 to a rearmost trailing edge 225 or a rearmost location of the club head 200 (dimension "B" in FIG. 2B) at each of the heel area 210 and the toe area 215. In some example structures, the first body portions 220 may extend rearward from the face 205 a distance of at least 20%, or even at least 25%, 30%, or 40% of the distance from the club face 205 to the trailing edge or location (but, in at least some embodiments, these body portions 220 will extend no more than 60% of this distance). In other embodiments of the invention, the largest dimension of the first body portions 220 in the front-to-rear direction (dimension "A" in FIG. 2B) may constitute at least 10%, or even at least 20%, 25%, 30% or 40% of the largest overall front-to-rear dimension of the club (dimension "C" in FIG. 2B), but, in at least some embodiments, the largest front-to-rear dimension of the first body portions 220 will extend no more than 60% of the largest overall front-to-rear dimension of the club (dimension "C" in FIG. 2B). These dimensions may be determined with the club oriented at its intended ball address position (e.g., as shown in FIG. 2B).

As seen in FIGS. 2B and 2C, the distance that the first body portion 220 extends toward the trailing edge 225 may vary along the heel-to-toe direction of the first body portion 220. For example, as illustrated in FIGS. 2B and 2C, the distance that the first body portion 220 extends toward the trailing edge 225 may decline when approaching the longitudinal center of the club face 205 (for example, as shown by the curved edges 222 of portions 220 in FIGS. 2B and 2C). Looking to the example embodiment illustrated in these figures, the distance that the first body portion 220 extends toward the trailing edge 225 is the greatest at the extreme heel and toe areas 210, 215 and gradually declines to become non-existent before reaching the center of the club head 200 on both the top (see FIG. 2B) and bottom (see FIG. 2C) of the club head 200. Those skilled in the art will readily appreciate that the slope or rate at which the distance that the first body portion 220 extends toward the trailing edge 225 declines (hereinafter "rate of decline") may vary depending upon specific embodiments. Furthermore, additional embodiments may utilize a different rate of decline for the top and/or the bottom of the club, such that the curved edges 222 of one of the top or the bottom of the club face has a different rate of decline from the other. In yet still further embodiments, the rate of decline may be less than shown in FIGS. 2A-2C and 2E-2F, such that the first body portion 220 contacts the club face 205 at about the center of the club face 205, albeit the distance that the first body portion 220 extends toward the trailing edge 225 at the center will be less than at the toe and the heel areas 210, 215. The rates of decline need not be the same in the heel area 210 and the toe area 215 of a given club head structure (i.e., the first body portion 220 in the heel area 210 may be shaped differently from the first body portion 220 in the toe area 215). The edges 222 may be straight, curved, or shaped in any desired configuration. Also, if desired, the material of the first body portion 220 in the heel area 210 may be different from the material of the first body portion 220 in the toe area 215 (although both may have a lower modulus of elasticity compared to the second body portion 230, as will be described in more detail below).

The first body portions 220 comprise at least one material that differs from the materials comprising club face 205, such that the first body portion 220 has a different modulus of elasticity than the club face 205. In one embodiment, the first body portion 220 is a first titanium component. As used herein, the term "titanium component" is to encompass one or more titanium metals and/or alloys that are suited for inclusion within the structure of a club head disclosed herein, including at least club head 200 and club head 300 (discussed in more detail below). Titanium components may be the same as titanium metal and alloy materials as are conventionally known and used in the golf club head art. In one embodiment, where the first body portion 220 is a first titanium component, the first titanium component may be a Titanium 15-3-3-3 alloy (commercially available from ATI Allvac, Monroe, N.C.). As used herein, "Titanium 15-3-3-3" refers to titanium alloys having the general chemical formula:

| Element | % by Weight |
|---|---|
| Aluminum | 2.5-3.5% |
| Carbon | 0.05% maximum |
| Chromium | 2.5-3.5% |
| Hydrogen 2 | 0.015% maximum |
| Iron | 0.25% maximum |
| Nitrogen | 0.05% maximum |
| Oxygen | 0.13 maximum |
| Tin | 2.5-3.5% |
| Vanadium | 14-16% |
| Titanium | Balance |

Titanium 15-3-3-3 may have a modulus of elasticity ("E") of about 13.5 lbs-in$^2 \times 10^6$. As used in this specification, the term "minor amounts" means less than 0.5% by weight.

As further seen in FIGS. 2B and 2C, the golf club head 200 further comprises a second body portion 230. The second body portion 230 in this example structure 200 is located proximate to the club face 205 at about the longitudinal (heel-to-toe) center of the club face crown and extends away from the club face 205 toward the trailing edge 225 of the club head 200. The second body portion 230 in this example structure 200 comprises materials that allow the second body portion 230 to have a higher modulus of elasticity than that of the first body portion 220. By constructing the second body portion 230 of materials exhibiting a higher modulus of elasticity than the materials comprising the first body portion 220, the first body portion 220 is more susceptible to deformation when compared to the second body portion 230, thereby increasing the area of the club head face 205 that exhibits an increase in coefficient of restitution. In other words, making the toe area 215 and heel area 210 of the club head more susceptible to deformation via material 220 will increase the trampoline effect exhibited by the face when a ball strike is located off center and toward the heel or toe. (The coefficient of restitution of the club head 200 will be discussed in more detail below). The higher modulus of elasticity component 230 provides a solid base that better resists deformation and supports components 220 and their deformation.

In one embodiment, the second body portion 230 comprises a second titanium component. In one such embodiment, the second body portion 230 comprises Titanium KS120 (e.g., an α-type titanium material commercially available from Kobe Steel, Tokyo, Japan). In one example structure 200 where the first body portion 220 comprises a titanium component and the second body portion 230 further comprises a titanium component that has a higher modulus of elasticity than the first body portion 220, the first body portion 220 may comprise Titanium 15-3-3-3 and the second body portion 230 may comprise Titanium KS120. Regardless of the specific compositions of the first body portion 220 and the second body portion 230, the second body portion 230 of this example structure 200 will exhibit a higher modulus of elasticity than the first body portion 220.

Figure 2D:
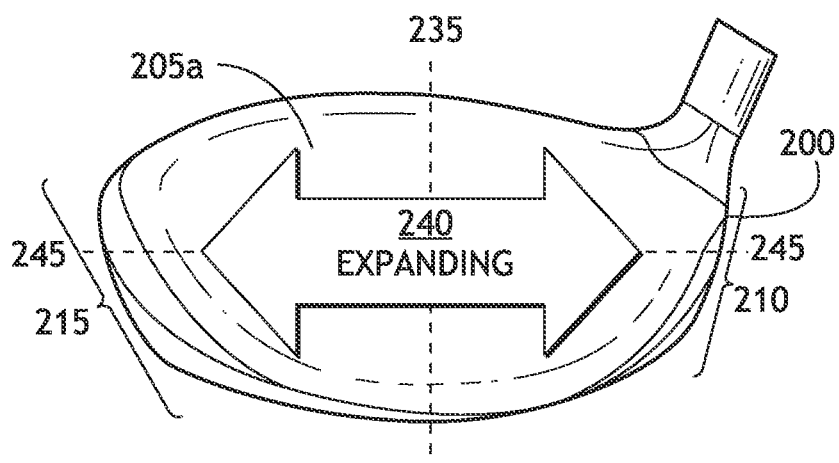
FIG. 2D shows a front view of an exemplary golf club head according to embodiments of the invention.

As shown in FIG. 2D, the configuration, placement and interaction among the club face 205, the first body portion 220 and the second body portion 230 will provide a club head 200 having a club face 205 with a higher coefficient of restitution in the regions toward the toe area 215 and the heel area 210 as compared with similar club head structures made without the first body portions 220 (e.g., similar club structures that include the high modulus of elasticity material 230 at the locations of the first body portions 220). As seen in FIG. 2D, axis 235 is positioned at about a longitudinal center of the club face 205 in the heel-to-toe direction. Imaginary arrow 240 extends away from the axis 235 toward both the heel area 210 and the toe area 215 of the club head 200 along axis 245. While the highest coefficient of restitution for this club head may remain at the central area of the face 205 (e.g., at about the intersection of axes 235 and 245), the increased deformability in the heel area and the toe area (due to low modulus of elasticity regions 220) expands the area of the club face 205 in which higher coefficients of restitution may be exhibited (i.e., the coefficient of restitution exhibited toward the heel and toe areas may be somewhat higher as compared to the coefficient of restitution for similar club heads in which material 220 is replaced with a higher modulus of elasticity material, such as material 230). In other words, aspects of this structure according to the invention will tend to expand the area of the club head's "sweet spot" in at least the heel-to-toe direction. Upon review of this disclosure, those skilled in the art will readily understand that the configuration, placement and interaction among various club components may be altered to allow the adjustment of the coefficient of restitution along one or more axis in addition to the axis 245. For example, in one embodiment as will be described in more detail below, the coefficient of restitution may be increased along axis 235.

Figure 2E:
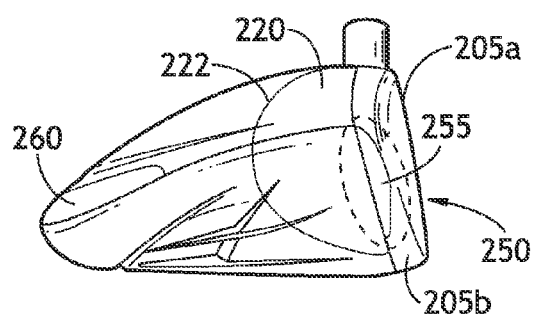
FIGS. 2E and 2F show side perspective views of an example club head according to an embodiment of the invention. Specifically.
Figure 2F:
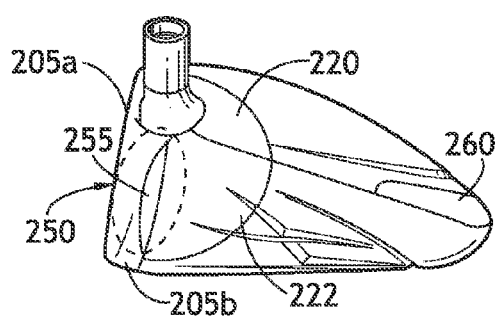

In yet another embodiment, the dimensions of one or more components, such as the return portion 205b of club face 205, may vary at different locations. FIGS. 2E and 2F show side perspective views of an example club head 200 according to an embodiment of the invention. Specifically, FIG. 2E is a side view of club head 200 showing the toe area in the foreground. FIG. 2F is a side view of the same club head 200 showing the heel area in the foreground. As seen in the circled areas 250, the return portion 205b of the club face 205 is not uniform. For example, in the embodiments shown in area 250, the return portion 205b of the club face 205 extends rearward a greater distance at the center of the club face than at the heel area 210 and/or and toe area 215.

As also shown in FIGS. 2E and 2F, the return portion 205b along the sides of this example club face 205 is curved so that the relatively low modulus of elasticity material in portion 220 extends forward and very close to the front of the ball striking face 205a. This feature, in effect, replaces a portion of the relatively deformation resistant material of the return portion 205b of the ball striking face 205 with the relatively deformable material of portion 220 in both the heel and toe areas. This feature further increases the susceptibility of the overall golf club face to deformation (and thus increases the area having an improved COR response, as described above). As further illustrated in FIG. 2C, the portion 220 may extend very close to the ball striking surface 205a (regions 220a) in both the lower toe region and the lower heel region, which further has the effect of increasing the susceptibility to deformation and increasing the COR response of the club head away from the center.

As will be appreciated by those skilled in the art, the club head 200 may comprise body portions in addition to the one or more first body portions 220 and the second body portion 230 (which also may be made from one or multiple independent parts or pieces), such as a third body portion, a fourth body portion, etc. For example, the exemplary club head 200 shown in FIGS. 2A, 2B, 2E, and 2F comprises a third body portion 260 that is located along the top of the club head 200 along the trailing edge 225. In certain embodiments, one or more additional body portions, such as the third body portion 260, may comprise material exhibiting a higher modulus of elasticity than the first body portion 220. In one such embodiment, the one or more additional body portions comprise one or more titanium components. In those embodiments where the third body portion 260 comprises a titanium component, the titanium component may be different than the titanium component of the second body portion 230. If desired, the third body portion 260 may be made of a more dense material or may be formed to include one or more weight members, so that additional weighting is applied to the rear portion of the club head structure (and optionally outward toward the heel and/or toe sides of the club head 200). This third body portion 260 may be used by club designers, if desired, to control the final weighting characteristics of the club head, e.g., to heel weight the club or to toe weight the club, to thereby provide a draw-biased club, a fade biased club, or other club weighting features.

Figure 3A:
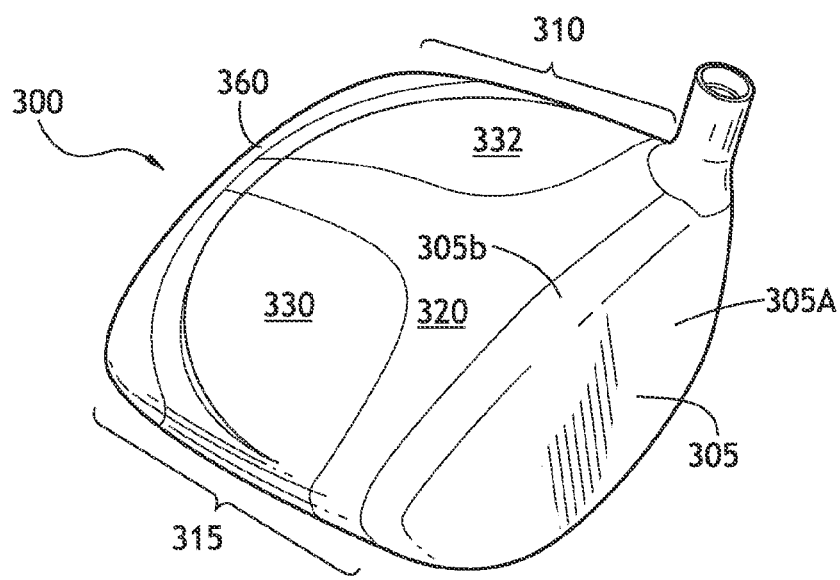
FIG. 3A shows a frontal perspective view of an example golf head according to embodiments of the invention.

FIG. 3A is a perspective view of an example hollow, wood-type club head 300 according to a further embodiment of the invention. Exemplary club head 300 comprises a club face 305, which in some embodiments, is similar to club face 205. As seen in FIG. 3A, the club face 305 is disposed on a front end (facing toward the right and at the direction of the viewer) and generally extends from the heel area 310 to the toe area 315 of the club head 300. While the club face 305 is shown as uniform, those skilled in the art will readily appreciate that the club face 305 may be shaped or sloped in one or more directions (e.g., having roll or bulge characteristics) and may further comprise other features, such as grooves or scorelines over at least some portion of its surface, e.g., for increasing ball spin upon impact. The face member 305 may constitute a cup-shaped face member including a ball striking surface 305a and a return portion 305b extending rearward from the ball striking surface 305a.

Club head 300 comprises a first body portion 320 proximate to the club face 305 extending at least 10% and less than 60% (dimension "A" in FIG. 3B) of the distance from the club face 305 toward a trailing edge 325 of the head (dimension "C" in FIG. 3B) at each of the heel area 310 and the toe area 315. The first body portion 320 proximate the club face 305 and at the center and crown of the club face 305 (dimension "B" in FIG. 3B) further may extend at least 40% of the distance to the trailing edge at the center of the club face 305 (dimension "C" in FIG. 3B). If desired, the center sole portion of the club head may include an elongated finger of the material of the first portion 320 (e.g., to appear the same as or similar to the center crown body portion's extended finger), as illustrated in FIG. 3C. In some examples, dimension A may constitute at least 20%, at least 25%, at least 30% or at least 40% of dimension C, and dimension B may constitute at least 60%, at least 75%, at least 85%, or even 100% of dimension C. Dimension B will generally be greater than Dimension A. In other embodiments of the invention, the largest dimension of the first body portion 320 in the front-to-rear direction at the heel and toe areas of the club head (dimension "A" in FIG. 3B) may constitute at least 20%, or even at least 25%, 30% or 40% of the largest overall front-to-rear dimension of the club (dimension "D" in FIG. 3B), but, in at least some embodiments, the largest front-to-rear dimension of the first body portion in the heel and toe areas (dimension "A") will extend no more than 60% of the largest overall front-to-rear dimension of the club (dimension "D"). In some embodiments, the largest dimension of the first body portion 320 in the front-to-rear direction at the central area of the club head (dimension "B" in FIG. 3B) may constitute at least 60%, or even at least 75%, 85% or 95% of the largest overall front-to-rear dimension of the club (dimension "D" in FIG. 3B). These dimensions may be determined with the club oriented at its intended ball address position (e.g., as shown in FIG. 3B).

The first body portion 320 comprises at least one material that differs from the materials comprising club face 305. As explained below, the first body portion 320 is constructed of materials that are more susceptible to deformation when compared to at least some of the remaining club portions, thereby increasing the area of the club head that exhibits an increased coefficient of restitution (the coefficient of restitution of the club head 300 will be discussed in more detail below in relation to FIG. 3D). In one embodiment, the first body portion 320 is a first titanium component, such as Titanium 15-3-3-3, as described above.

Figure 3B:
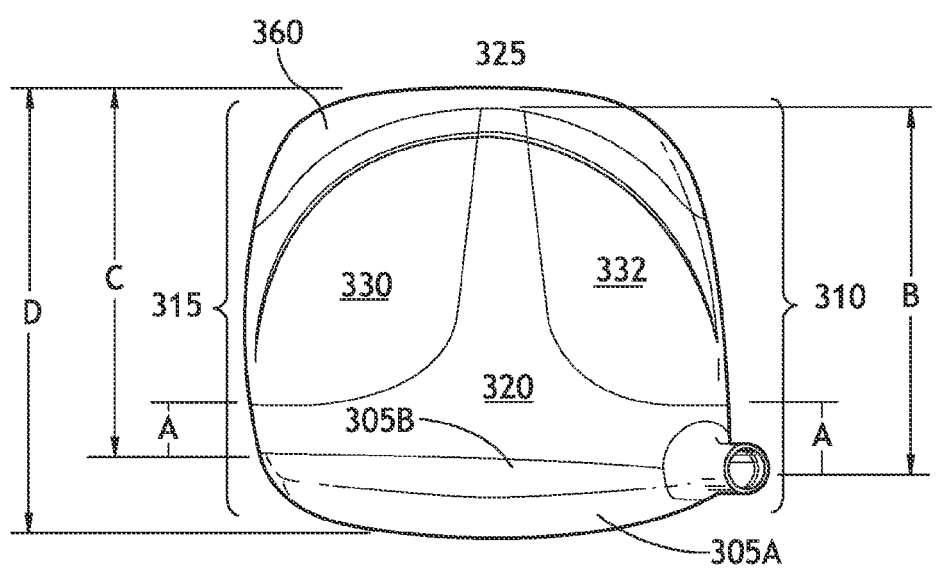
FIG. 3B is a top view of the example club head shown in FIG. 3A.
Figure 3C:
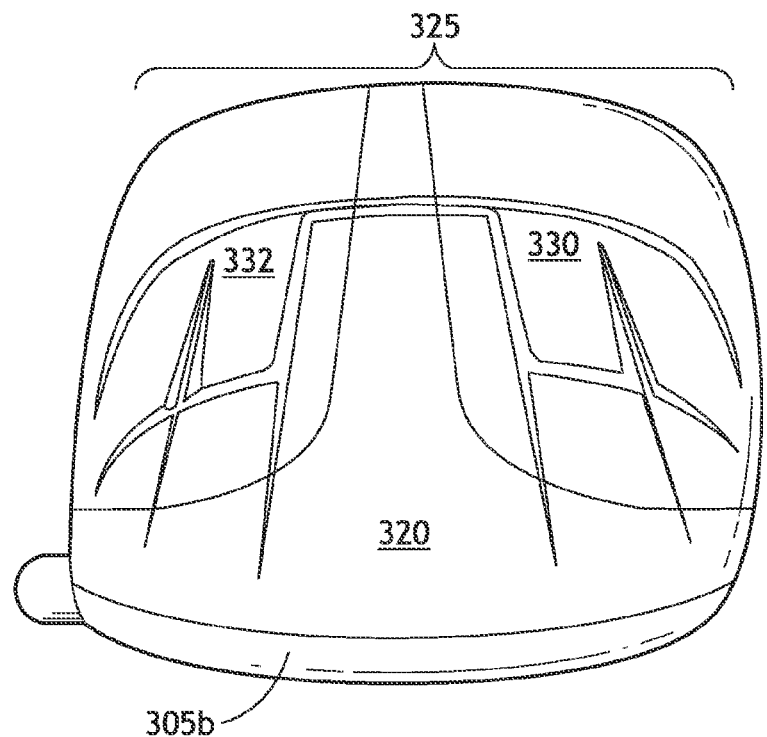
FIG. 3C is a bottom view of the example club head shown in FIG. 3A.

As best seen in FIGS. 3B and 3C, club head 300 further includes a second body portion 330 proximate to the first body portion 320 at the toe area 315 of the club head 300 that extends toward the trailing edge 325 and toward the center of the club head 300. The composition of the second body portion 330 has a higher modulus of elasticity than the composition of the first body portion 320, thus making the second body portion 330 generally less susceptible to deformation than the first body portion 320. In one embodiment, the second body portion 330 comprises a second titanium component, such as Titanium KS120, as described above. In one embodiment, where the first body portion 320 comprises a titanium component and the second body portion 330 further comprises a titanium component, the first body component 320 may comprise Titanium 15-3-3-3 and the second body component 330 may comprise Titanium KS120.

As further shown in FIGS. 3B and 3C, the club head 300 further comprises a third body portion 332 located proximate to the first body portion 320 at the heel area 310 of the club head 300 that extends toward the trailing edge 325 and toward the center of the club head 300. This third body portion 332 also has a higher modulus of elasticity than the first body portion 320. In one embodiment, the third body portion 332 comprises substantially the same structural materials as the second body portion 330, such that the second and third body portions 330, 332 have the same modulus of elasticity. In certain embodiments, both the second and third body components 330, 332 comprise titanium components, such as Titanium KS120, as described above. Regardless of the composition of the second or third body portions 330, 332, in at least some example structures according to this invention, both the second and third body portions 330, 332 will exhibit a higher modulus of elasticity than the first body portion 320.

Figure 3D:
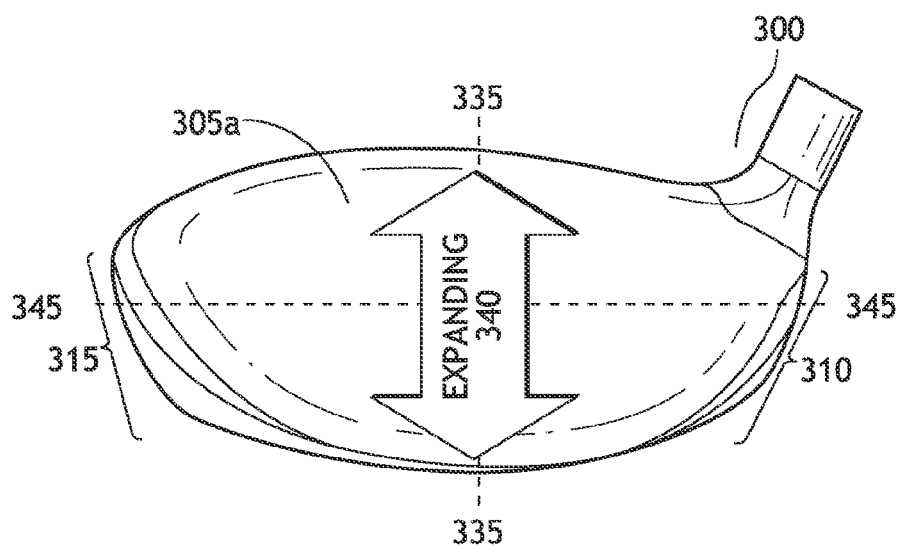
FIG. 3D shows a front view of an exemplary golf club head according to embodiments of the invention.
Figure 3F:
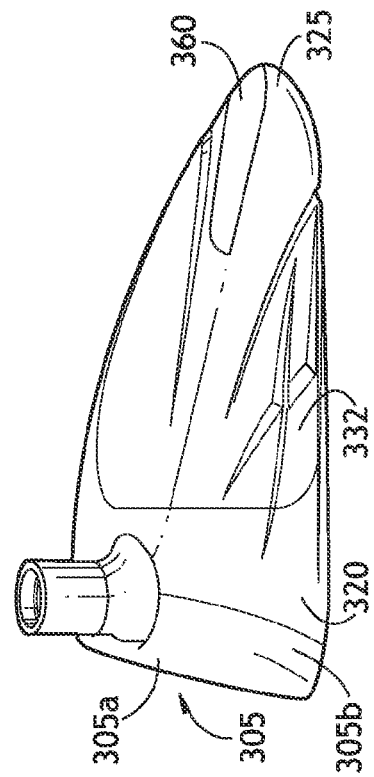
FIGS. 3E and 3F show side perspective views of an example club head according to an embodiment of the invention. Specifically.
Figure 3E:
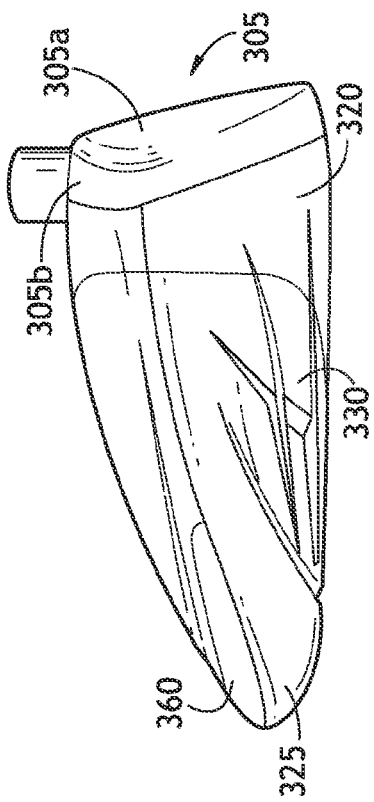

Further, as shown in FIG. 3D, the configuration, placement and interaction among the club face 305, the first body portion 320, the second body portion 330, and the third body portion 332 will provide a club head 300 having a club face 305 having a higher coefficient of restitution in the regions along a longitudinal center of the club face 305, for example along axis 335, as compared to the coefficient of restitution of club heads of similar structure in which portion 320 is replaced with a material having a higher modulus of elasticity, like that in portions 330 and/or 332. The coefficient of restitution of the club face 305 along axis 345 in this example structure, however, will be at least higher than a club head without the first body portion 320 along the heel and toe areas 310, 315 due to the proximity of the first body portion 320 to the club face 305 in the heel and toe areas 310, 315 (e.g., as described above in conjunction with the embodiment of FIGS. 2A through 2F). Notably, in this example structure, low modulus of elasticity portion 320 constitutes a perimeter member that engages an entire perimeter of the face member 305 (although, if desired, portion 320 need not completely surround the perimeter of the face member 305).

As discussed in relation to FIGS. 2E and 2F, the dimensions of one or more components of the club head structure may vary at different locations on the club head structure. For example, if desired, the dimensions of the return portion 305*b* of the club head face 305 in the front-to-rear direction may vary around the perimeter of the club face 305. Furthermore, as will be appreciated by those skilled in the art, the club head 300 may comprise additional body portions in addition to the first, second and third body portions 320, 330, 332 discussed above. For example, the exemplary club head 300 shown in FIGS. 3A, 3B, 3E and 3F comprises a fourth body portion 360 that is located along the top of the club head 300 along the trailing edge 325. In certain embodiments, one or more additional body portions, such as the fourth body portion 360, may comprise material exhibiting a higher modulus of elasticity than the first body portion 320. In one such embodiment, the one or more additional body portions comprise one or more titanium components. Yet in further embodiments where the fourth body portion 360 comprises a titanium component, that titanium component may be different than the titanium component of the second and the third body portions 330, 332. As noted above in conjunction with component 260 in FIG. 2A, portion 360 also may constitute a weight or a weight bearing member, e.g., a member that allows a club designer to alter and control the weighting characteristics of the club.

3. Exemplary Methods

Another aspect of this invention relates to methods of producing golf club heads in accordance with examples of this invention (e.g., of the types described above). Such methods may include, for example, methods of joining a plurality of structural components of the golf club head to form the club head. In one embodiment, the method comprises the attaching of a first body portion, 220, 320 of the club head to at least a portion of a club face 205, 305 that extends from a heel area to a toe area, for example, to the return portions 205*b* and 305*b* of the cup-type club faces 205, 305, shown in FIGS. 2A and 3A, respectively. The method may further comprise attaching a second body portion, such as elements 230, 330, and/or 332 of FIGS. 2B and 3B, to the first body portion 220, 320. This second body portion may be arranged to engage the first body portion and/or the club face and extend away from the club face 205, 305 toward a trailing edge or point 225, 325 of the club head 200, 300. This second body portion 230, 330, 332 will have a higher modulus of elasticity than the first body portion 220, 320. While any desired method of joining the various club head components may be used without departing from this invention, in at least some examples, the component parts will be joined together by cements, adhesives, welding, soldering, brazing, mechanical connectors (optionally releasable mechanical connectors), and the like. The various component parts may be joined in manners that are conventional and known in the art.

In one exemplary method, the first body portion may constitute multiple parts, e.g., that resemble elements 220 of FIGS. 2A-2C and therefore may be attached proximate to the club face 205 at each of the heel area 210 and the toe area 215. These elements 220 may extend at least about 10% of the distance from the club face 205 toward the trailing edge 225 of the club head 205. The second body portion 230 may be attached so as to be located proximate to the club face 205 at the about a longitudinal center of the club face 205, and it may extend away from the club face 205 toward the trailing edge 225 of the club head 200.

In yet another method, the first body portion may constitute a single part, e.g., that resembles element 320 of FIGS. 3A-3C. This part 320 creates a circumference of material proximate to the club face 305 and extending less than 60% of the distance to a trailing edge 325 of the club head 300 at each of the toe area 315 and the heel area 310, and further at least 60% of the distance to a trailing edge 325 at the center of the club face 305.

Upon review of this disclosure, those skilled in the art will realize that obvious variations may be introduced into the above methods, such as adjusting the amount, type, shape, and/or combination of materials and attachments that may be utilized to manufacture golf club heads that fall within the scope of the invention.

4. COR Measurements

Figure 4:
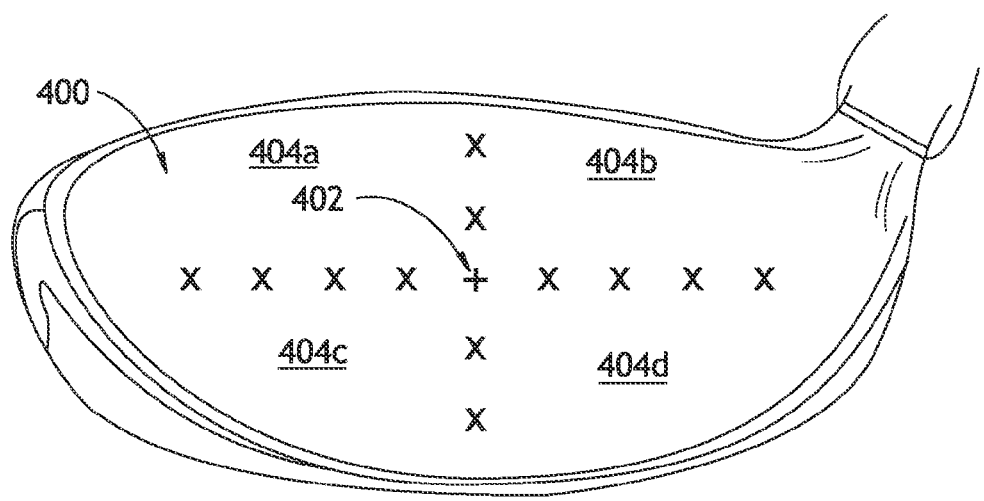
FIG. 4 is an illustrative aid for describing measurement of improvement of the coefficient of restitution response in club head faces according to examples of this invention.

FIG. 4 is an illustrative aid to help explain the improvement in COR across a club head face 400 in accordance with at least some examples of the invention. As noted above, in general, the highest COR on a golf club face 400 will tend to be at or near the geometrical center of the club head face 400 (e.g., at or near central point 402 in this illustrated example). The COR tends to decease as one moves away from the central point 402 toward the edges of the club head face 400 (e.g., due to the additional support provided by the side structures of the club head, by the stiffening properties provided as a result of bends provided in the club face (e.g., the bends from the ball striking face surface to the return portion of a cup-type club face, etc.), etc. In accordance with the example club head structure 200 illustrated in FIGS. 2A through 2F, the extreme side portions of the toe area 215 and the heel area 210 are made from a material having a lower modulus of elasticity (materials 220) as compared to the material of the face 205 and/or the material of a majority of the body portion (e.g., portion 230). This lower modulus of elasticity portion 220 is more susceptible to deformation, particularly above a predetermined club head/golf ball collision velocity (e.g., greater than 90 mph). This deformation increases the COR response of the golf club head face when contact with a golf ball is located in a direction away from the geometrical center of the face 402 and toward the heel or toe areas of the club head face (e.g., as the contact point moves away from the center of the face 402 in a horizontal direction in FIG. 4). In effect, the lower modulus of elasticity portions have the effect of expanding the "sweet spot" of the club face in the heel and toe directions and providing an improved COR response on off center hits.

In accordance with the example club head structure 300 illustrated in FIGS. 3A through 3F, the entire perimeter around the club head face 305 is made from a material having a lower modulus of elasticity (material 320) as compared to the material of the face 305 and/or the material of a majority of the club head body (e.g., portion 330 and/or 332). This lower modulus of elasticity portion 320 is more susceptible to deformation, particularly above a predetermined club head/golf ball collision velocity (e.g., greater than 90 mph). As noted above with regard to the structure of FIGS. 2A through 2F, this deformation increases the COR response of a golf club head face when contact with a golf ball is located in a direction away from the geometrical center of the face 402 and toward the heel or toe areas of the club head face (e.g., as the contact point moves away from the center of the face 402 in a horizontal direction in FIG. 4). Additionally, because of the presence of the relatively low modulus material 320 adjacent the extreme top and bottom portions of the club head face 305, this deformation increases the COR response of a golf club face when contact with a golf ball is located in a direction away from the geometrical center of the face 402 and toward the crown or sole areas of the club head face (e.g., as the contact point moves away from the center of the face 402 in a vertical direction in FIG. 4). In effect, aspects of this invention increase the COR response of a golf club face on off center hits as compared with the COR response of a similar structured golf club head in which the low modulus of elasticity material is replaced with a higher modulus of elasticity material (e.g., the material of the club head face and/or the material of some of the other body portions of the club head, such as portions 230, 330, and/or 332 described above). In both illustrated embodiments, improvements in the COR response also will be realized in areas away from the center of the club face and between the horizontal and vertical directions extending from this center location (e.g., in the various quadrants 404(a) through 404(d) of the club face shown in FIG. 4). COR response for purposes of this invention may be measured under the conditions prescribed by the United States Golf Association for testing golf club heads for compliance with the COR standards.

As noted above, in accordance with this invention, the COR response of a golf club head is measured and compared against the COR response of a golf club head having the same structure but in which the low modulus of elasticity material of the club head body portions at the heel and toe areas (e.g., portions 220) and/or the low modulus of elasticity material of the club face perimeter portion (e.g., portion 320) is replaced with a higher modulus of elasticity material (e.g., the material of the club head face, the material of other body portions (such as portions 230, 330, and/or 332) etc.

In accordance with at least some examples of this invention, points located ½ inch from the geometrical center of the club head face toward the heel or toe of the club head (e.g., along a horizontal line from the geometric center) will have at least a 5% improved COR value for the inventive club heads as compared to the comparative club heads (as described above). As additional examples, points located ½ inch from the geometrical center of the club head face toward the heel or toe of the club head (e.g., along a horizontal line from the geometric center) will have at least a 10% improved COR value, or even at least a 15% improved COR value, for the inventive club heads. In accordance with at least some additional examples of this invention, points located 1 inch from the geometrical center of the club head face toward the heel or toe of the club head (e.g., along a horizontal line from the geometric center) will have at least a 5% improved COR value for the inventive club heads as compared to the comparative club heads, and as additional examples, points located 1 inch from the geometrical center of the club head face toward the heel or toe of the club head (e.g., along a horizontal line from the geometric center) will have at least a 10% improved COR value, or even at least a 15% improved COR value, for the inventive club heads as compared to the comparative club heads. In accordance with at least some additional examples of this invention, points located 1½ inches from the geometrical center of the club head face toward the heel or toe of the club head (e.g., along a horizontal line from the geometric center) will have at least a 5% improved COR value for the inventive club heads as compared to the comparative club heads, and as additional examples, points located 1½ inch from the geometrical center of the club head face toward the heel or toe of the club head (e.g., along a horizontal line from the geometric center) will have at least a 10% improved COR value, or even at least a 15% or at least a 20% improved COR value, for the inventive club heads as compared to the comparative club heads. In accordance with still some additional examples of this invention, points located 2 inches from the geometrical center of the club head face toward the heel or toe of the club head (e.g., along a horizontal line from the geometric center) will have at least a 5% improved COR value for the inventive club heads as compared to the comparative club heads, and as additional examples, points located 2 inches from the geometrical center of the club head face toward the heel or toe of the club head (e.g., along a horizontal line from the geometric center) will have at least a 10% improved COR value, or even at least a 15% or at least a 20% improved COR value, for the inventive club heads as compared to the comparative club heads.

In accordance with still at least some additional examples of this invention, points located ½ inch from the geometrical center of the club head face toward the crown or sole of the club head (e.g., along a vertical line from the geometric center) will have at least a 5% improved COR value for the inventive club heads as compared to the comparative club heads. As additional examples, points located ½ inch from the geometrical center of the club head face toward the crown or sole of the club head (e.g., along a vertical line from the geometric center) will have at least a 10% improved COR value, or even at least a 15% improved COR value, for the inventive club heads as compared to the comparative club heads. In accordance with at least some additional examples of this invention, points located 1 inch from the geometrical center of the club head face toward the crown or sole of the club head (e.g., along a vertical line from the geometric center) will have at least a 5% improved COR value for the inventive club heads as compared to the comparative club heads, and as additional examples, points located 1 inch from the geometrical center of the club head face toward the crown or sole of the club head (e.g., along a vertical line from the geometric center) will have at least a 10% improved COR value, or even at least a 15% improved COR value, for the inventive club heads as compared to the comparative club heads.

5. Additional Potential Features

While the invention has been described in terms of specific examples, those skilled in the art will recognize that numerous modifications can be made to the structures and methods described herein without departing from this invention. For example, if desired, the face member (e.g., members 205 and 305) may have variable face thicknesses, for example, including raised or thickened rear surfaces, e.g., in the central portion of the face, to help further control the stiffness or flexibility of the face (and to help control the COR response of the face). As another example, if desired, the low modulus of elasticity region may be provided only in the toe portion of the club head or only in the heel portion of the club head. Also, while the illustrated club heads generally have a squared shape or footprint, those skilled in the art will recognize that aspects of this invention may be practiced with wood-type club structures have any desired shape, including any known or conventional shapes that are used in the art.

While any specific dimensions, characteristics, and/or ranges of dimensions and characteristics may be used for a given club head structure (such as the ranges described in U.S. Published Patent Appln. No. 2005-0239576 A1 published Oct. 27, 2005), those skilled in the art will recognize that these dimensions and ranges are simply examples that may be used in at least some example club head structures of the invention. Many variations in the ranges and the specific dimensions and characteristics may be used without departing from this invention, e.g., depending on the type of club, user preferences, user swing characteristics, and the like, and these features may be controlled depending on the characteristics of the body member(s) attached to the face member. For example, various dimensions and/or characteristics may be used (such as various loft angles, face angles, head weights, lie angles, center of gravity angles, inset distances, lengths, breadths, heights, face thicknesses, crown thicknesses, sole thicknesses, body member thicknesses, hosel diameters, volumes, bulge radii, roll radii, body densities, etc.), e.g., depending on whether the golf club head is a driver, a 2-wood, a 3-wood, a 4-wood, a 5-wood, a 7-wood, a 9-wood, a wood-type hybrid club, etc. Also, various dimensions and/or characteristics may be provided to suit a user's preferences and/or swing characteristics; to provide the desired launch angle, carry distance, and/or other characteristics for the club; etc. Additionally, various different shaft characteristics (such as stiffness, flex point, kick point, etc.) may be used to further allow change and control over the club's and the club head's feel and characteristics.

Golf club heads in accordance with examples of this invention may use the club head design and/or geometry to produce other desired club head characteristics. For example, in some club head structures in accordance with this invention, the body of the club head will be designed such that the club head will have a larger head and/or face length (e.g., heel-to-toe, dimension "L" in FIG. 2B) relative to the club head's depth or breadth (e.g., front-to-back, dimension "B" in FIG. 2B) and a "squared" structure, which results in a club head that is more torsionally stable (i.e., more resistant to twisting), thereby producing a more consistent, reliable, and/or straight golf ball flight. Golf club heads and golf clubs in accordance with at least some of these example aspects of the invention may include a body member sized so as to provide a club head body having an overall club head length dimension L of at least 4.5 inches, at least 4.6 inches, at least 4.7 inches, at least 4.8 inches, or even at least 4.9 inches, and a ratio of an overall club head breadth dimension to the overall club head length dimension (B/L) of 0.9 or more and 1 or less. Club heads in accordance with at least some examples of this invention may have a ratio of club head breadth to club head length of at least 0.94, at least 0.95, at least 0.96, at least 0.97, or even at least 0.98. Club heads in accordance with at least some examples of this invention also may have some or all of the characteristics described in U.S. Published Patent Appln. No. 2007/0298903, filed on Jun. 22, 2006 in the name of John Thomas Stites, et al., which document is entirely incorporated herein by reference.

In golf club heads in accordance with at least some examples of this invention, the body member may be sized such that the overall club head breadth B dimension may be at least 4.2 inches, at least 4.3 inches, at least 4.4 inches, at least 4.5 inches, at least 4.6 inches, at least 4.7 inches, at least 4.8 inches, or even at least 4.9 inches. As with the examples described above, the club head body according to at least some examples of this aspect of the invention may be dimensioned such that the overall club head length dimension L is at least 4.7 inches, at least 4.8 inches, or even at least 4.9 inches, and/or such that the overall club head body size is 500 cm$^3$ or less, 470 cm$^3$ or less, or even 460 cm$^3$ or less. In some examples, the interchangeable body member will be sized and shaped such that the overall club head body size or volume will be at least 350 cc, at least 400 cc, at least 420 cc, or even at least 450 cc.

CONCLUSION

While the invention has been described in detail in terms of specific examples including presently preferred modes of carrying out the invention, those skilled in the art will appreciate that there are numerous variations and permutations of the above described systems and methods. Thus, the spirit and scope of the invention should be construed broadly as set forth in the appended claims.

I claim:

1. A golf club head comprising:
a club face extending from a toe area to a heel area;
a first body portion engaged at the heel area of the club face, wherein the first body portion extends in a front-to-rear direction at least 10% of an overall club head breadth dimension and less than 60% of the overall club head breadth dimension, and wherein the first body portion has a first modulus of elasticity;
wherein the first body portion comprises a titanium alloy that contains, by weight, from 2.5 to 3.5% aluminum; from 2.5 to 3.5% chromium; from 2.5-3.5% tin; from 14-16% aluminum; optionally minor amounts of hydrogen, iron, nitrogen, oxygen, or impurities; and the balance titanium;
a second body portion engaged at the toe area of the club face, wherein the second body portion extends in the front-to-rear direction at least 10% of the overall club head breadth dimension and less than 60% of the overall club head breadth dimension, wherein the second body portion has a second modulus of elasticity that may be the same as or different from the first modulus of elasticity; and
a third body portion having a higher modulus of elasticity than the first and second body portions, wherein the third body portion is engaged with the club face at about a center of the club face in a heel-to-toe direction and extends away from the club face toward the rear of the club head.

2. A golf club head according to claim 1, wherein the third body portion and the club face surround the first body portion and the second body portion and wherein the second body portion and third body portion are made of KS 120.

3. A golf club head according to claim 1, wherein the first body portion extends in the front-to-rear direction at least 25% of the overall club head breadth dimension, and wherein the second body portion extends in the front-to-rear direction at least 25% of the overall club head breadth dimension.

4. A golf club head comprising:
a face component including a ball striking face extending between a toe end and a heel end of the golf club head; and
a club head body extending rearward from the face component, wherein the club head body includes:
  a toe body portion adjacent the toe end of the face component, wherein the toe body portion has a first modulus of elasticity,
  a heel body portion adjacent the heel end of the face component, wherein the heel body portion has a second modulus of elasticity, wherein at least one of the toe and heel comprises a first titanium component;
  a major body portion including one or more portions extending rearward from the toe body portion and the heel body portion, wherein the major body portion has a third modulus of elasticity that is greater than the first modulus of elasticity and the second modulus of elasticity,
wherein the golf club head has a COR response at a location spaced horizontally one-half inch from a geometric center of the face component that is higher than a COR response at a location spaced horizontally one-half inch from the geometric center of a face component of a similarly structured golf club head in which the toe body portion and the heel body portion are replaced with corresponding body portions made of a material having the third modulus of elasticity or higher, wherein the COR responses are measured under standard USGA testing conditions.

5. The golf club head of claim 4, wherein the first titanium component is a titanium alloy that contains, by weight, from 2.5 to 3.5% aluminum; from 2.5 to 3.5% chromium; from 2.5-3.5% tin; from 14-16% aluminum; optionally minor amounts of hydrogen, iron, nitrogen, oxygen, or impurities; and the balance titanium.

6. The golf club head of claim 5, wherein the heel portion is a second titanium component.

7. The golf club head of claim 6, wherein the second titanium component comprises KS 120.

8. The golf club head of claim 6, wherein the major body portion is a third titanium component.

9. The golf club head of claim 4, wherein a return portion of the club face extends rearward a greater distance at a center crown portion of the club face than at each of the heel area and toe area.

* * * * *